United States Patent
Ikegami et al.

(10) Patent No.: US 12,475,719 B1
(45) Date of Patent: Nov. 18, 2025

(54) INFORMATION PROCESSING METHOD, AND INFORMATION PROCESSING DEVICE

(71) Applicant: Nissan Motor Co., Ltd., Yokohama (JP)

(72) Inventors: Takashi Ikegami, Kanagawa (JP);
Haruo Matsuo, Kanagawa (JP);
Masanobu Nagase, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/854,822

(22) PCT Filed: Apr. 8, 2022

(86) PCT No.: PCT/IB2022/000195
§ 371 (c)(1),
(2) Date: Oct. 7, 2024

(87) PCT Pub. No.: WO2023/194762
PCT Pub. Date: Oct. 12, 2023

(51) Int. Cl.
*G06V 20/58* (2022.01)
*G01S 17/86* (2020.01)
*G01S 17/89* (2020.01)

(52) U.S. Cl.
CPC .............. *G06V 20/58* (2022.01); *G01S 17/86* (2020.01); *G01S 17/89* (2013.01)

(58) Field of Classification Search
CPC .......... G06V 20/58; G01S 17/86; G01S 17/89
See application file for complete search history.

(56) References Cited

U.S. PATENT DOCUMENTS

| | | | |
|---|---|---|---|
| 9,098,754 B1 * | 8/2015 | Stout | G06T 7/70 |
| 9,628,775 B2 * | 4/2017 | Bridges | G01B 5/012 |
| 10,491,885 B1 * | 11/2019 | Hicks | G06V 20/56 |
| 11,818,361 B2 | 11/2023 | Takagi et al. | |

(Continued)

FOREIGN PATENT DOCUMENTS

| | | |
|---|---|---|
| JP | 2017229061 A | 12/2017 |
| JP | 2019008609 A | 1/2019 |

(Continued)

OTHER PUBLICATIONS

Gregory P Meyer et al: "Sensor Fusion for Joint 3D Object Detection and Semantic Segmentation", arxiv.org, Cornell University Library, 201Olin Library Cornell University Ithaca, NY 14853, Apr. 25, 2019 (Apr. 25, 2019), XP081173804.

*Primary Examiner* — Brian P Yenke
(74) *Attorney, Agent, or Firm* — Young Basile Hanlon & MacFarlane, P.C.

(57) ABSTRACT

An information processing method and an information processing device assign attribute information to each ranging point based on an image obtained by capturing an image of surroundings of a vehicle using an imaging unit, or based on point cloud data related to ranging points around the vehicle generated by a sensor, calculate a distance from the imaging unit to the ranging point and a direction of the ranging point as viewed from the imaging unit based on the point cloud data, calculate a pixel value for each ranging point based on the distance to the ranging point and the attribute information, and generate a two-dimensional image in which pixel corresponding to the direction of the ranging point has the pixel value.

8 Claims, 4 Drawing Sheets

(56) References Cited

U.S. PATENT DOCUMENTS

| | | | |
|---|---|---|---|
| 12,181,567 B2* | 12/2024 | Ikegami | G06V 20/56 |
| 12,315,179 B2* | 5/2025 | Nobayashi | H04N 7/18 |
| 2017/0270375 A1* | 9/2017 | Grauer | G06V 10/60 |
| 2017/0293810 A1* | 10/2017 | Allen | G01C 21/26 |
| 2017/0365063 A1 | 12/2017 | Tsuji | |
| 2018/0232947 A1* | 8/2018 | Nehmadi | G01S 7/295 |
| 2019/0012798 A1* | 1/2019 | Amano | G06T 7/11 |
| 2019/0158732 A1* | 5/2019 | Shimauchi | G06F 3/4023 |
| 2020/0104610 A1* | 4/2020 | Matsumoto | G06V 20/58 |
| 2020/0142032 A1* | 5/2020 | Chen | G01S 17/931 |
| 2020/0258299 A1* | 8/2020 | Kobayashi | G06T 17/20 |
| 2020/0278450 A1 | 9/2020 | Lasang et al. | |
| 2020/0301019 A1* | 9/2020 | Shiba | G01S 17/931 |
| 2021/0063578 A1* | 3/2021 | Wekel | G01S 17/894 |
| 2021/0064037 A1* | 3/2021 | Boutaud | G01S 17/42 |
| 2021/0094580 A1 | 4/2021 | Uraki | |
| 2021/0110217 A1 | 4/2021 | Gunel | |
| 2021/0183016 A1* | 6/2021 | Toyoura | G01S 7/4808 |
| 2021/0352323 A1* | 11/2021 | Sugio | H04N 19/85 |
| 2021/0358175 A1 | 11/2021 | Iguchi et al. | |
| 2021/0387636 A1* | 12/2021 | Kim | B60W 60/001 |
| 2022/0012505 A1* | 1/2022 | Kato | G06V 20/58 |
| 2022/0017117 A1 | 1/2022 | Yamamoto | |
| 2022/0075077 A1* | 3/2022 | Kato | G01S 7/4817 |
| 2022/0120908 A1* | 4/2022 | Kato | G01S 7/4814 |
| 2022/0191511 A1 | 6/2022 | Takagi et al. | |
| 2022/0270375 A1* | 8/2022 | Kurotobi | G06V 10/255 |
| 2022/0398851 A1* | 12/2022 | Nehmadi | G01S 17/931 |
| 2022/0413112 A1* | 12/2022 | Katou | G01S 17/89 |
| 2023/0057118 A1* | 2/2023 | Bankiti | G06T 7/20 |
| 2023/0106443 A1* | 4/2023 | Kurotobi | G01S 7/4802 |
| | | | 382/103 |
| 2023/0206600 A1* | 6/2023 | Sekiguchi | G01S 17/42 |
| | | | 382/106 |
| 2023/0286548 A1* | 9/2023 | Tanaka | B60W 60/00272 |
| 2023/0311896 A1* | 10/2023 | Baek | G06V 20/56 |
| | | | 701/1 |
| 2024/0114119 A1* | 4/2024 | Sato | H04N 13/271 |
| 2024/0290108 A1* | 8/2024 | Komatsu | G01S 13/931 |

FOREIGN PATENT DOCUMENTS

| | | |
|---|---|---|
| JP | 2021056075 A | 4/2021 |
| WO | 2019098318 A1 | 5/2019 |
| WO | 2020166612 A1 | 8/2020 |
| WO | 2020183839 A1 | 9/2020 |

* cited by examiner

INFORMATION PROCESSING METHOD, AND INFORMATION PROCESSING DEVICE

TECHNICAL FIELD

The present invention relates to an information processing method and an information processing device.

BACKGROUND

A technique has been proposed in which the data volume of point cloud data having a large data volume is compressed by converting point cloud data output from a ranging sensor into a two-dimensional image with pixel values based on the position information of each ranging point in three-dimensional space, and compressing it using existing image compression technology (International Publication No. 2020/183839).

SUMMARY

According to the technology described in International Publication No. 2020/183839, a two-dimensional image is generated by determining pixel values based only on the position information in three-dimensional space of each ranging point obtained by a ranging sensor, thus, there is a problem in that it is not possible to retain attribute information in the two-dimensional image other than the position information of each ranging point.

The present invention has been made in view of the above problems. An object of the present invention is to provide an information processing method and an information processing device that can generate a two-dimensional image that retains other attribute information in addition to the position information of each ranging point.

In order to solve the above-described problems, an information processing method and an information processing device, according to an aspect of the present invention, assign attribute information to each ranging point based on an image obtained by capturing an image of surroundings of a vehicle using an imaging unit, or based on point cloud data related to ranging points around the vehicle generated by a sensor, calculate a distance from the imaging unit to the ranging point and a direction of the ranging point as viewed from the imaging unit based on the point cloud data, calculate a pixel value for each ranging point based on the distance to the ranging point and the attribute information, and generate a two-dimensional image in which pixel corresponding to the direction of the ranging point has the pixel value.

According to the present invention, it is possible to generate a two-dimensional image that retains other attribute information in addition to the position information of each ranging point.

DETAILED DESCRIPTION

Figure 1:
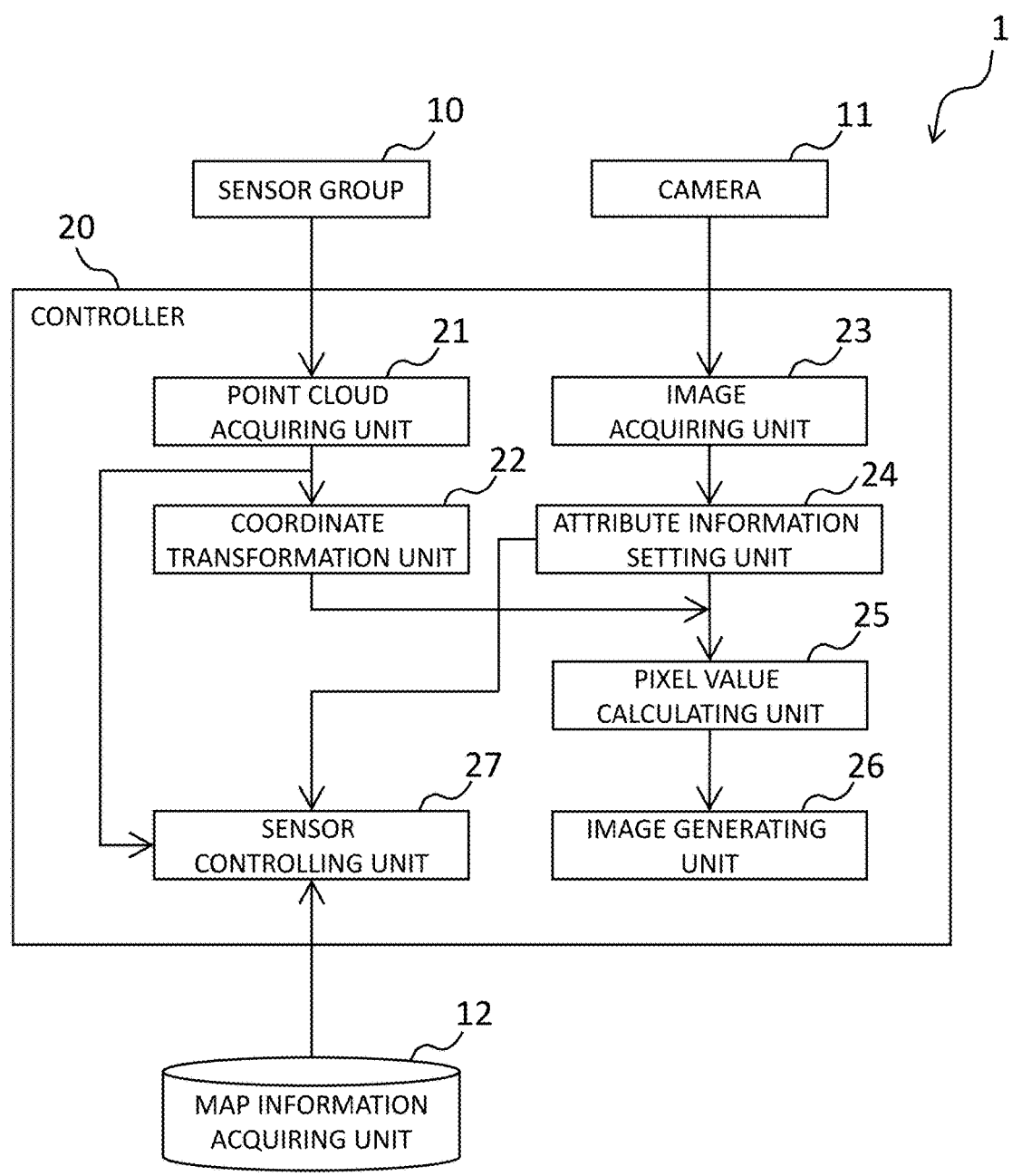
FIG. 1 is a block diagram illustrating a configuration of an information processing device 1 according to an embodiment of the present invention.

Hereinafter, embodiments of the present invention will be described with reference to the drawings. In the description of the drawings, the same items are designated by the same reference numerals and duplicate description will be omitted.

[Configuration of Information Processing Device]

An example of the configuration of an information processing device 1 will be described with reference to FIG. 1. FIG. 1 is a block diagram illustrating a configuration of an information processing device 1 according to this embodiment. As shown in FIG. 1, the information processing device 1 includes a sensor group 10 (sensor), a camera 11 (imaging unit), a map information acquiring unit 12, and a controller 20.

The information processing device 1 may be installed in a vehicle that has an automatic driving function, or may be installed in a vehicle that does not have an automatic driving function. Further, the information processing device 1 may be installed in a vehicle that can switch between automatic driving and manual driving.

Furthermore, the automatic driving function may be a driving assistance function that automatically controls only some of the vehicle control functions, such as steering control, braking force control, and driving force control, to support the driver's driving. In this embodiment, the information processing device 1 will be described as being installed in a vehicle having an automatic driving function.

Although omitted in FIG. 1, the information processing device 1 may control various actuators such as a steering actuator, an accelerator pedal actuator, and a brake actuator based on the recognition results (position, shape, posture, etc. of an object) by the attribute information setting unit 24. This makes it possible to realize highly accurate automated driving.

The sensor group 10 mainly includes sensors that measure the distance and direction to objects around an own vehicle. An example of such a sensor is a lidar (LIDAR: Laser Imaging Detection and Ranging). The lidar is a device that measures the distance and direction to an object and recognizes the shape of objects by emitting light (laser light) to objects around the vehicle and measuring the time it takes for the light (reflected light) to hit the object and bounce back. Furthermore, the lidar can also obtain three-dimensional positional relationships between objects. Note that it is also possible to perform mapping using the intensity of reflected light.

For example, the lidar scans the surroundings of its own vehicle in the main scanning direction and the sub scanning direction by changing the direction of light irradiation. As a result, light is sequentially irradiated to a plurality of ranging points around the own vehicle. A round of irradiation of light to all ranging points around the own vehicle is repeated at predetermined time intervals. The lidar generates information for each ranging point (ranging point information)

obtained by irradiating light. Then, the lidar outputs point cloud data consisting of a plurality of ranging point information to the controller 20.

The ranging point information includes position information of the ranging point. The position information is information indicating the position coordinates of the ranging point. A polar coordinate system may be used for the position coordinates, which is expressed by the direction from the lidar to the ranging point (yaw angle, pitch angle) and the distance (depth) from the lidar to the ranging point. For the position coordinates, a three-dimensional coordinate system expressed by x coordinate, y coordinate, and z coordinate with the origin at the installation position of the lidar may be used. Further, the ranging point information may include time information of the ranging point. The time information is information indicating the time when the position information of the ranging point was generated (the reflected light was received). In addition, the ranging point information may include information on the intensity of reflected light from the ranging point (intensity information).

Note that the direction of light irradiation by the lidar may be controlled by a sensor controlling unit 27, which will be described later.

In addition, the sensor group 10 may include a GPS receiver or a GNSS receiver that detects the position of the own vehicle. The sensor group 10 may also include a speed sensor, an acceleration sensor, a steering angle sensor, a gyro sensor, a brake oil pressure sensor, an accelerator opening sensor, etc. that detect the state of the own vehicle. Information acquired by the sensor group 10 is output to the controller 20. In the following, unless otherwise specified, the representative of the sensor group 10 will be described as the lidar, and the information output to the controller 20 will be described as information acquired by the lidar.

The camera 11 includes an imaging device such as a CCD (charge-coupled device) or a CMOS (complementary metal oxide semiconductor). The installation location of the camera 11 is not particularly limited, but as an example, the camera 11 is installed at the front, side, or rear of the own vehicle. The camera 11 continuously images the surroundings of the own vehicle at a predetermined period. The camera 11 detects objects around the own vehicle (pedestrians, bicycles, motorcycles, other vehicles, etc.) and information in front of the own vehicle (demarcation lines, traffic lights, signs, crosswalks, intersections, etc.). The image captured by the camera 11 is output to the controller 20. Note that the image captured by the camera 11 may be stored in a storage device (not shown), and the controller 20 may refer to the image stored in the storage device.

The area measured (detected) by the lidar and the area imaged (detected) by the camera 11 overlap in whole or in part. The lidar generates point cloud data regarding ranging points included in the imaging area of the camera 11.

The map information acquiring unit 12 acquires map information indicating the structure of the road on which the vehicle travels. The map information acquired by the map information acquiring unit 12 may include the position information of a traffic light, the type of traffic light, the position of a stop line corresponding to the traffic light, and the like. The map information acquiring unit 12 may own a map database storing map information, or may acquire map information from an external map data server using cloud computing. Furthermore, the map information acquiring unit 12 may acquire map information using vehicle-to-vehicle communication or road-to-vehicle communication.

The map information acquired by the map information acquiring unit 12 may include information on road structures such as absolute positions of lanes, connection relationships between lanes, and relative position relationships. Further, the map information acquired by the map information acquiring unit 12 may also include information on facilities such as parking lots and gas stations.

The road information around the own vehicle is composed of an image captured by the camera 11, information obtained by the sensor group 10, and map information obtained by the map information acquiring unit 12. In addition, the road information around the own vehicle may be acquired from outside the own vehicle through vehicle-to-vehicle communication or road-to-vehicle communication, in addition to being acquired by the acquiring unit.

The controller 20 is a general-purpose microcomputer that includes a CPU (central processing unit), memory, and an input/output unit. A computer program for functioning as the information processing device 1 is installed in the microcomputer. By executing the computer program, the microcomputer functions as a plurality of information processing circuits included in the information processing device 1. The controller 20 processes data acquired from the sensor group 10 and the camera 11.

Here, an example is shown in which a plurality of information processing circuits included in the information processing device 1 are realized by software. However, it is also possible to configure information processing circuits by preparing dedicated hardware for executing each of the following information processing. Further, a plurality of information processing circuits may be configured by individual hardware.

The controller 20 includes a point cloud acquiring unit 21, a coordinate transformation unit 22, an image acquiring unit 23, an attribute information setting unit 24, a pixel value calculating unit 25, an image generating unit 26, and a sensor controlling unit 27, as examples of a plurality of information processing circuits (information processing functions). Note that the controller 20 may be expressed as an ECU (Electronic Control Unit).

The point cloud acquiring unit 21 acquires point cloud data from the lidar. The point cloud acquiring unit 21 outputs the acquired point cloud data to the coordinate transformation unit 22.

The coordinate transformation unit 22 calculates the distance from the camera 11 to the ranging point and the direction of the ranging point as viewed from the camera 11 based on the acquired point cloud data. For example, the coordinate transformation unit 22 may convert position information in reference to the installation position of the lidar to position information in reference to the position of the camera 11, based on the difference between the installation positions of the lidar and the camera 11.

Further, the coordinate transformation unit 22 may convert position information in reference to the installation position of the lidar to position information in reference to the position of the camera 11, based on the timing of imaging by the camera 11, the timing of generating point cloud data by the lidar, and the movement information of the own vehicle (the moving direction and the vehicle speed of the own vehicle). The process of converting position information based on these timings is useful when the timing of imaging by the camera 11 and the timing of generating point cloud data by the lidar are not synchronized.

The image acquiring unit 23 acquires a captured image captured by the camera 11. The image acquiring unit 23 outputs the acquired captured image to the attribute information setting unit 24. Note that if an area where there is a high possibility that an object to be recognized exists is known, the image acquiring unit 23 may extract and output only that area.

The attribute information setting unit 24 performs recognition processing for objects and signs (hereinafter referred to as "objects or the like") around the vehicle on the captured image acquired from the image acquiring unit 23. The recognition processing is an example of image processing, and is a process which detects and identifies the objects or the like around the own vehicle (mainly in front of the own vehicle) and associates attribute information, which is a value that uniquely identifies the objects or the like, with each pixel. Such image processing can use, for example, semantic segmentation that estimates the likelihood that each pixel is the objects or the like. Further, the attributes may be classified and identified according to the type or color of the objects or the like. In this embodiment, "objects or the like" include moving objects such as cars, trucks, buses, motorcycles, and pedestrians, etc., as well as stationary objects such as pylons, small animals, falling objects, buildings, walls, guardrails, construction site frames, etc. Furthermore, "objects or the like" may include road markings marked on the road surface with special paint, to provide necessary guidance, inducement, warning, regulation, instructions, etc. for road traffic. Examples of road markings include division lines (broken white lines), crosswalks, stop lines, and direction arrow lines, etc.

Note that since the attribute information setting unit 24 associates attribute information with each pixel that constitutes the captured image acquired from the image acquiring unit 23, as a result, the attribute information setting unit 24 can assign attribute information to each ranging point that appears in the captured image.

In addition, the attribute information setting unit 24 may perform recognition processing of objects and signs (hereinafter referred to as "objects or the like") around the vehicle based on point cloud data. In particular, since the shape of objects around the vehicle is expressed by point cloud data, the attribute information setting unit 24 may assign attribute information to each ranging point using a method such as pattern matching. In this way, the attribute information setting unit 24 assigns attribute information to each ranging point based on the captured image or point cloud data.

The pixel value calculating unit 25 calculates a pixel value for a pixel corresponding to the ranging point based on the distance to the ranging point and attribute information given to the ranging point. More specifically, the pixel value calculating unit 25 calculates the pixel value based on distance information corresponding to the distance to the ranging point and attribute information that is a value that uniquely identifies the objects or the like appearing in the captured image. In addition, the pixel value calculating unit 25 may calculate the pixel value based on intensity information indicating the intensity of reflected light from the ranging point. Note that the pixel value calculating unit 25 specifies a pixel corresponding to the ranging point in the captured image based on the direction of the ranging point as viewed from the camera 11, which is calculated by the coordinate transformation unit 22.

Figure 3:
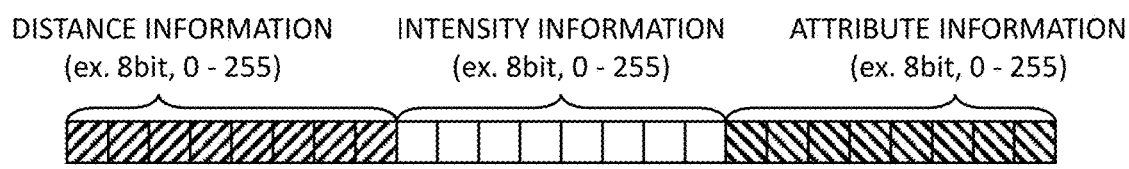
FIG. 3 is a diagram illustrating a configuration example of pixel values set for each pixel corresponding to a ranging point.

An example of pixel value calculation by the pixel value calculating unit 25 will be described using FIG. 3. FIG. 3 is a diagram illustrating a configuration example of pixel values set for each pixel corresponding to a ranging point.

FIG. 3 shows that the distance information, the intensity information, and the attribute information are each 8-bit data, and these pieces of information are connected to form 24-bit data representing the pixel value. In this way, the pixel value calculating unit 25 combines the data of the distance information, the intensity information, and the attribute information to calculate the pixel value. Note that the pixel value calculating unit 25 may calculate the pixel value by combining data of the distance information and the attribute information.

In addition, although FIG. 3 shows an example in which the pixel value is 24-bit data, the present invention is not limited to this. The pixel value may have a number of bits other than 24 bits. Although an example is shown in which the distance information, the intensity information, and the attribute information are each 8-bit data, the present invention is not limited to this. These pieces of information may have bit numbers other than 8 bits.

In addition, after setting the correspondence relationship between the distance to the ranging point and the pixel value, the pixel value calculating unit 25 may calculate the distance information (pixel value) corresponding to the distance to the ranging point based on the correspondence relationship (Hereinafter, the distance information and the pixel value will be explained without making any particular distinction between them). More specifically, the pixel value calculating unit 25 may change the resolution of the distance depending on the distance when discretizing the distance and expressing the distance using distance information made up of a predetermined number of bits. An example of the correspondence relationship set by the pixel value calculating unit 25 will be explained using FIG. 4A, FIG. 4B, and FIG. 4C.

Figure 4A:
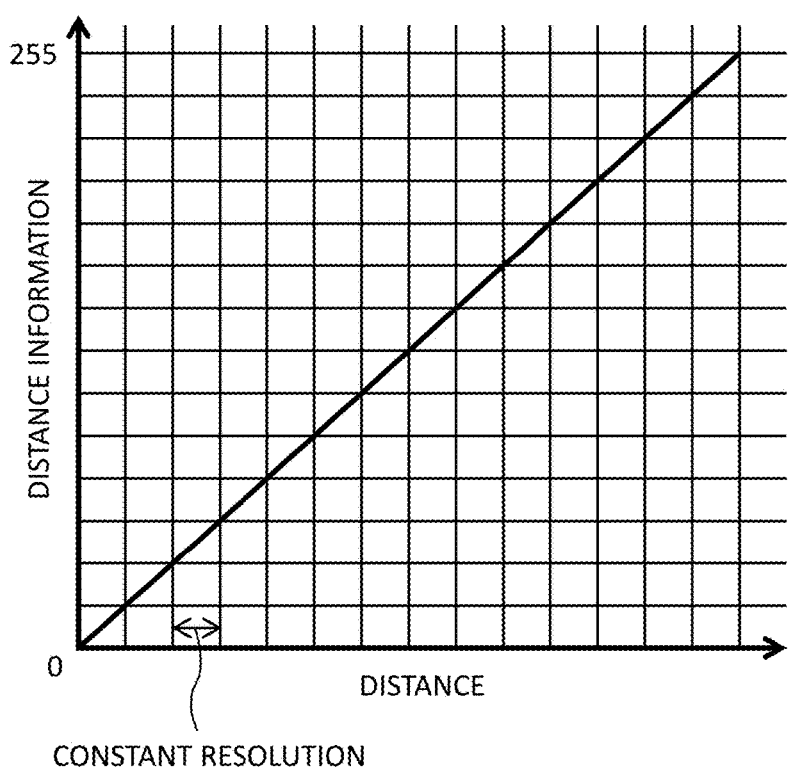
FIG. 4A is a diagram illustrating a first example regarding the correspondence relationship between distance and distance information.

FIG. 4A is a diagram illustrating a first example regarding the correspondence relationship between distance and distance information. FIG. 4A shows how the value (pixel value) indicated by the distance information increases in proportion to the distance. That is, according to the correspondence relationship shown in FIG. 4A, the resolution is constant regardless of distance.

Figure 4B:
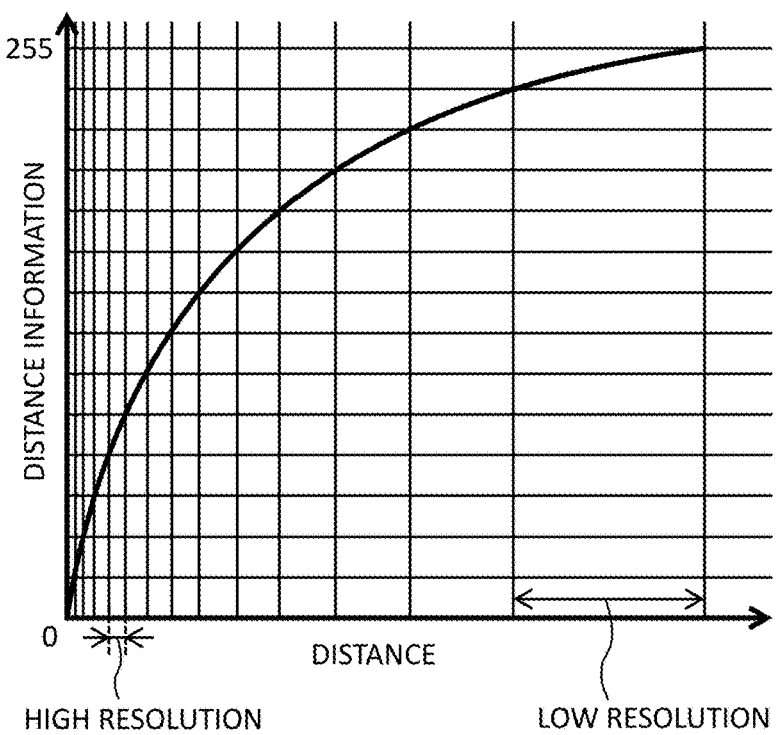
FIG. 4B is a diagram illustrating a second example regarding the correspondence relationship between distance and distance information.

FIG. 4B is a diagram illustrating a second example regarding the correspondence relationship between distance and distance information. FIG. 4B shows how the shorter the distance, the larger the amount of change in the value (pixel value) indicated by the distance information per unit amount of change in distance. That is, according to the correspondence relationship shown in FIG. 4B, the shorter the distance, the higher the resolution.

Figure 4C:
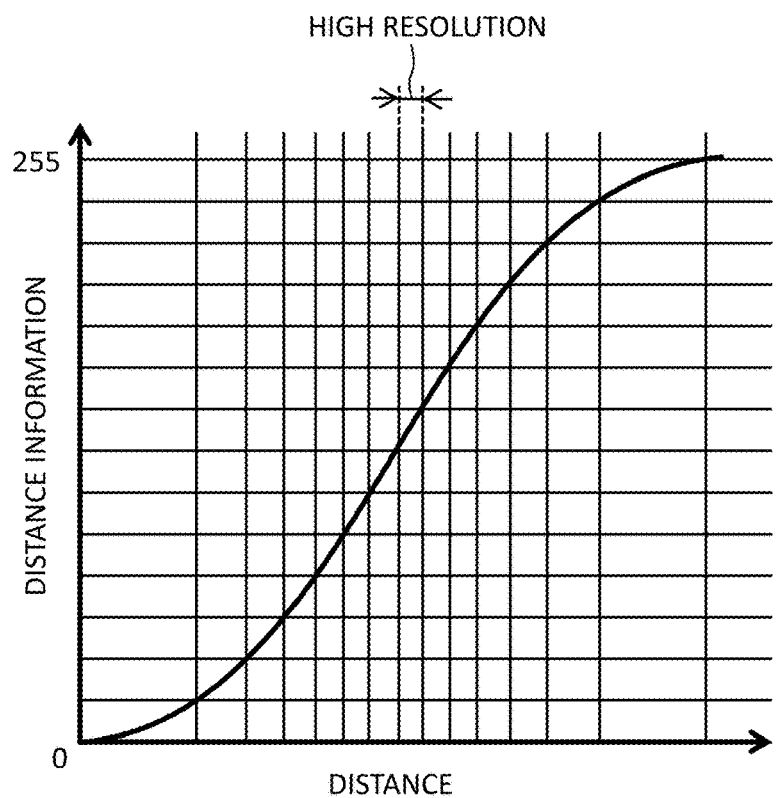
FIG. 4C is a diagram illustrating a third example regarding the correspondence relationship between distance and distance information.

FIG. 4C is a diagram illustrating a third example regarding the correspondence relationship between distance and distance information. FIG. 4C shows that when the distance is within a predetermined range (a medium distance range in FIG. 4C), the amount of change in the value (pixel value) indicated by the distance information per unit change in distance becomes greater than when the distance is not within the predetermined range. Furthermore, it is shown that when the distance is not within the predetermined range, the amount of change in the value indicated by the distance information per unit amount of change in distance becomes smaller. That is, according to the correspondence relationship shown in FIG. 4C, when the distance is within the predetermined range, the resolution is high, and when the distance is not within the predetermined range, the resolution is low.

In this way, the pixel value calculating unit 25 may set various correspondence relationships. Note that the pixel value calculating unit 25 may set the correspondence relationship based on the surrounding situation of the vehicle or the behavior of the vehicle.

For example, in order to accurately represent the distance for ranging points in the vicinity of the vehicle, the pixel value calculating unit 25 may set a correspondence relationship between distance and distance information so that the shorter the distance, the greater the change in distance information (pixel value) per unit change in distance. For example, the pixel value calculating unit 25 may set a correspondence relationship that improves distance resolution in the vicinity of the vehicle when the own vehicle is decelerating or when there is another vehicle nearby in front of the own vehicle.

Furthermore, the pixel value calculating unit 25 may select a first attribute information from the attribute information based on the behavior of the vehicle. Then, the pixel value calculating unit 25 may set a correspondence relationship between distance and pixel value so that the amount of change in pixel value per unit change in distance to the ranging point to which the first attribute information is assigned is greater than a predetermined value.

For example, a target object whose distance needs to be accurately expressed may change depending on the behavior of the vehicle. When the vehicle is changing lanes, a lane marker indicating the boundaries between adjacent lanes, a curb on the sides of the road, and a guardrail may be the target objects. Furthermore, when the vehicle accelerates or decelerates, a stop line, a traffic light, or another vehicle in front of the own vehicle may be the target objects. The pixel value calculating unit 25 may determine the predetermined range based on the distance at which such the target object is located, and may set a correspondence relationship that increases the distance resolution in the predetermined range.

Further, when the vehicle speed is greater than a predetermined speed, the pixel value calculating unit 25 may set a correspondence relationship between distance and pixel value so that the change in pixel value per unit change in distance at distances greater than the predetermined distance is greater than a predetermined value. When the speed of the vehicle is high, there may be a case where it is necessary to accurately express the distance of an object that is a long distance from the vehicle compared to an object that is a short distance from the vehicle. Therefore, when the speed of the vehicle is higher than the predetermined speed, the pixel value calculating unit 25 may set a correspondence relationship that improves the resolution of distance in a long distance from the vehicle.

The image generating unit 26 generates a two-dimensional image based on the direction of the ranging point and the pixel value calculated by the pixel value calculating unit 25 for the ranging point. More specifically, the image generating unit 26 generates a two-dimensional image such that pixels corresponding to the direction of the ranging point viewed from the camera 11 have the pixel values calculated by the pixel value calculating unit 25.

If the number of ranging points by the lidar is not sufficiently large, the number of pixels corresponding to ranging points will be fewer than the number of pixels constituting the captured image. Thus, the image generating unit 26 may generate a two-dimensional image by setting the pixel values of pixels that do not correspond to ranging points among the pixels constituting the two-dimensional image to dummy values indicating that they are not to be processed.

Note that the two-dimensional image generated by the image generating unit 26 may be output to the outside of the information processing device 1 and may be used for the vehicle control function. When outputting the two-dimensional image to the outside, information specifying the correspondence relationship set in the pixel value calculating unit 25 may be output to the outside of the information processing device 1.

The sensor controlling unit 27 controls the sensor group 10. In particular, the sensor controlling unit 27 controls the direction of light irradiation by the lidar, and increases the spatial density of ranging points in an area where there is a shortage of ranging points (hereinafter referred to as a "specific area"). That is, the sensor controlling unit 27 controls the lidar and increases the spatial density of ranging points in the specific area after control compared to the spatial density of ranging points in the specific area before control.

Examples of the specific area include a ranging point to which second attribute information set in advance is assigned and an area near the ranging point. In this case, the sensor controlling unit 27 may determine whether or not the second attribute information is included in the attribute information, and may control the lidar so as to increase the spatial density of ranging points at the position of the ranging point to which second attribute information is assigned, if it is determined that the second attribute information is included.

Furthermore, an example of the specific area may be a specific object that exists around the vehicle. Examples of specific objects include stationary objects such as pylons, small animals, fallen objects, buildings, walls, guardrails, and construction site frames. The presence or absence of a stationary object may be determined based on map information acquired by the map information acquiring unit 12. That is, the sensor controlling unit 27 may determine whether or not the specific object exists around the vehicle based on the map information, and may control the lidar so as to increase the spatial density of ranging points at the position of the specific object, if it is determined that the specific object exists.

Finally, a specific example of lidar control by the sensor controlling unit 27 will be shown. For example, the sensor controlling unit 27 increases the number of times the lidar scans in the main scanning direction or the sub scanning direction, thereby increasing the number of times light is irradiated per unit solid angle to the specific area around the own vehicle. As a result, the spatial density of ranging points in the specific area becomes higher than the spatial density of ranging points in other areas. By increasing the spatial density of ranging points in the specific area, it is possible to accurately detect the position and specify the target object located in the specific area.

[Processing Procedure of the Information Processing Device]

Figure 2:
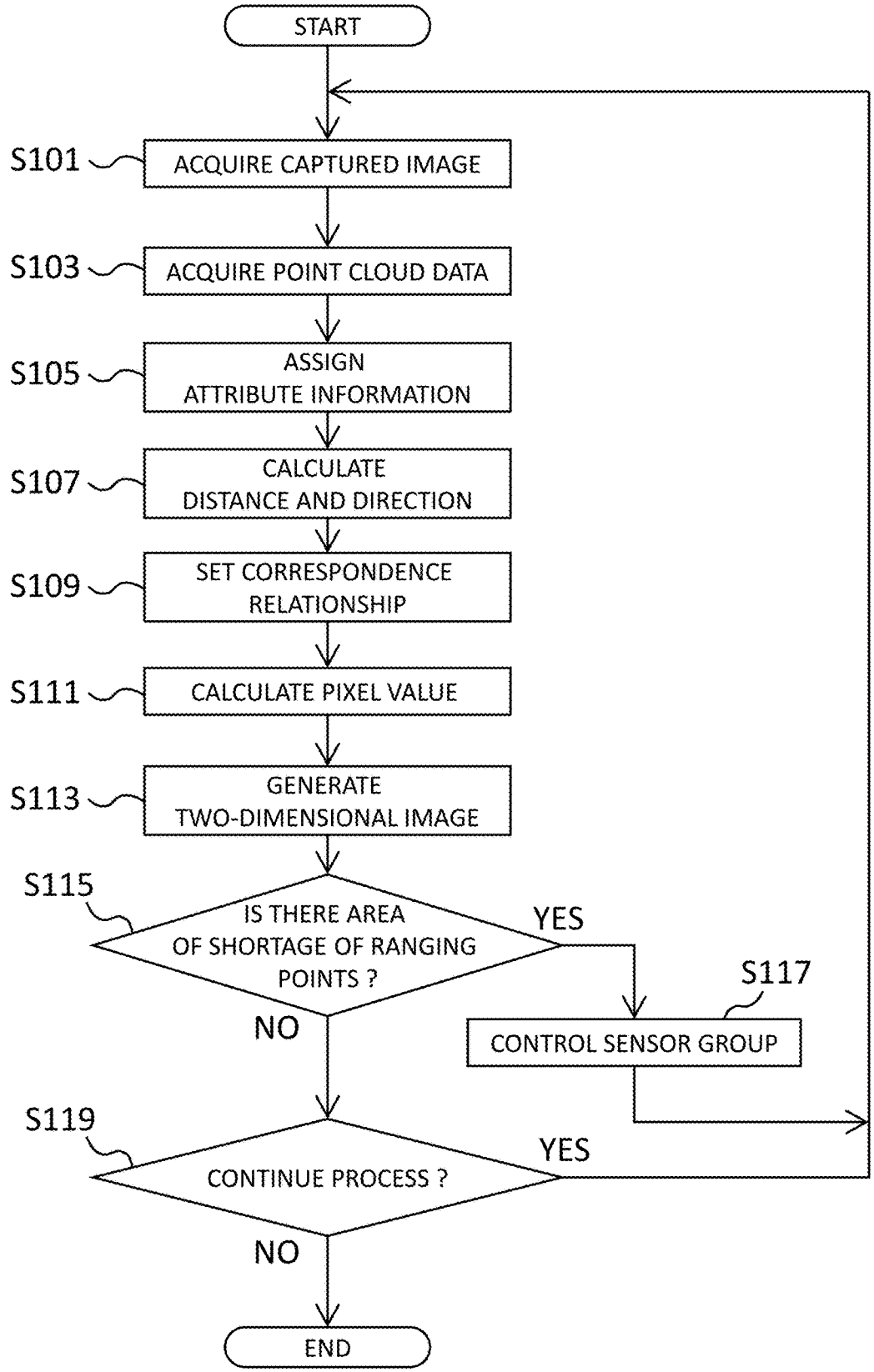
FIG. 2 is a flowchart illustrating a processing of the information processing device 1 according to the embodiment of the present invention.

Next, the processing procedure of the information processing device 1 according to the present embodiment will be described with reference to the flowchart of FIG. 2. FIG. 2 is a flowchart illustrating a processing of the information processing device 1 according to this embodiment. The process of the information processing device 1 shown in FIG. 2 may be repeatedly executed at a predetermined cycle.

First, in step S101, the image acquiring unit 23 acquires a captured image captured by the camera 11.

In step S103, the point cloud acquiring unit 21 acquires point cloud data from the lidar.

In step S105, the attribute information setting unit 24 assigns attribute information to each ranging point.

In step S107, the coordinate transformation unit 22 calculates the distance from the camera 11 to the ranging point and the direction of the ranging point as viewed from the camera 11, based on the acquired point cloud data.

In step S109, the pixel value calculating unit 25 sets the correspondence relationship between the distance to the ranging point and the pixel value.

In step S111, the pixel value calculating unit 25 calculates a pixel value for the pixel corresponding to the ranging point based on the distance to the ranging point and the attribute information assigned to the ranging point.

In step S113, the image generating unit 26 generates a two-dimensional image based on the direction of the ranging point and the pixel value calculated by the pixel value calculating unit 25 for the ranging point.

In step S115, the sensor controlling unit 27 determines whether or not there is an area where there is a shortage of ranging points. If it is determined that there is the area where there is a shortage of ranging points (YES in step S115), in step S117, the sensor controlling unit 27 controls the sensor group 10 to increase the spatial density of ranging points in the area where there is a shortage of ranging points.

On the other hand, if it is determined that there is not the area where there is a shortage of ranging points (NO in step S115), in step S119, a determination is made as to whether or not the process of generating a two-dimensional image is to be continued. If it is determined that the process should be continued (YES in step S119), the process returns to step S101. If it is determined not to continue the process (NO in step S119), the flowchart of FIG. 2 ends.

Effect of Embodiments

As explained in detail above, an information processing method and an information processing device, according to the present embodiment, assign attribute information to each ranging point based on an image obtained by capturing an image of surroundings of a vehicle using an imaging unit, or based on point cloud data related to ranging points around the vehicle generated by a sensor, calculate a distance from the imaging unit to the ranging point and a direction of the ranging point as viewed from the imaging unit based on the point cloud data, calculate a pixel value for each ranging point based on the distance to the ranging point and the attribute information, and generate a two-dimensional image in which pixel corresponding to the direction of the ranging point has the pixel value.

As a result, it is possible to generate a two-dimensional image that retains other attribute information in addition to the position information of each ranging point. Further, the attribute information of an object that cannot be determined from the sensor group 10 but can be recognized only from the image captured by the camera 11 can be output together with three-dimensional position information of each ranging point. Furthermore, since it is generated as the two-dimensional image, the data volume can be reduced using existing image compression technology.

Specifically, compared to a lidar, when the camera 11 is used, a captured image with higher resolution and color information can be obtained. Thus, using captured images allows for more efficient recognition of stationary objects such as pylons, small animals, fallen objects, buildings, walls, guardrails, construction site frames, and signs whose colors have meaning, such as white lines, signs, and traffic lights. Therefore, by assigning the attribute information based on the captured image and outputting it together with the position information of each ranging point, it can be useful in determining whether recognized objects or the like affects the running of the vehicle.

Further, the information processing method and the information processing device, according to the present embodiment, may set a correspondence relationship between the distance and the pixel value, in which, the shorter the distance, the greater a change in the pixel value per unit change in the distance. This makes it possible to accurately represent distances for objects, road shapes, and the like in the vicinity of the own vehicle, which have a greater influence on vehicle control. As a result, more appropriate vehicle control can be performed.

Furthermore, the information processing method and the information processing device, according to the present embodiment, may set a correspondence relationship between the distance and the pixel value, in which a change in the pixel value per unit change in distance at distance greater than a predetermined distance is greater than a predetermined value, when a speed of the vehicle is greater than a predetermined speed. Thereby, when the speed of the vehicle is high, it is possible to accurately express the distance of an object that is long from the vehicle compared to an object that is short from the vehicle. As a result, more appropriate vehicle control can be performed.

Further, the information processing method and the information processing device, according to the present embodiment, may select a first attribute information from the attribute information based on a behavior of the vehicle, and may set a correspondence relationship between the distance and the pixel value, in which a change in pixel value per unit change in distance to the ranging point to which the first attribute information is assigned is greater than a predetermined value. In vehicle control, the area in which the positional accuracy of object recognition results is important changes depending on the behavior of the vehicle (vehicle speed, yaw rate, etc.). Therefore, it is possible to select an area where the positional accuracy of the object recognition result is important based on the behavior of the vehicle, to increase the distance resolution in the area, and to express the distance with high accuracy. As a result, more appropriate vehicle control can be performed.

Furthermore, the information processing method and the information processing device, according to the present embodiment, may determine whether or not a second attribute information is included in the attribute information, and may control the sensor to increase a spatial density of ranging points at a position of the ranging point to which second attribute information is assigned, in a case of determining that the second attribute information is included. As a result, it is possible to improve the detection position accuracy of objects that have a greater influence on vehicle control, such as vehicles that are close to the own vehicle and pedestrians that intersect with the trajectory of the own vehicle.

In addition, objects or the like that are smaller or elongated than the interval in the direction of irradiation of the lidar waves (laser light, millimeter waves, etc.) may not be detected because light is not irradiated on them, but they may be detectable by the camera 11 with a higher resolution than the lidar. Therefore, by controlling the light irradiation direction of the lidar based on the image recognition result, position information can be obtained by the lidar even for objects or the like that are smaller or elongated than the interval in the light irradiation direction.

Further, the information processing method and the information processing device, according to the present embodiment, may determine whether or not a specific object exists around the vehicle based on a map information, and may control the sensor to increase a spatial density of ranging points at a position of the specific object, in a case of determining that the specific object exists. Thereby, it is possible to improve the detection position accuracy of objects such as stop lines and crosswalks that have a greater influence on vehicle control.

Furthermore, the information processing method and the information processing device, according to the present embodiment, may calculate position information of the ranging point in reference to a position of the imaging unit at a timing of imaging by the imaging unit, based on a timing of imaging by the imaging unit, a timing of generating the point cloud data by the sensor, and a movement information of the vehicle, and may calculate the distance and the direction based on the position information. If the timing of image capture by the camera 11 and the timing of generation of point cloud data by the lidar are not synchronized, and the own vehicle moves, the position where the captured image was acquired is different from the position where the point cloud data was acquired. However, by correcting the position information of the ranging point based on these timings, the positional difference can be corrected.

Respective functions described in the above embodiment may be implemented by one or plural processing circuits. The processing circuits include programmed processors, electrical circuits, etc., as well as devices such as application specific integrated circuits (ASIC) and circuit components arranged to perform the described functions, etc.

Although the contents of the present invention have been described above with reference to the embodiment, the present invention is not limited to these descriptions, and it will be apparent to those skilled in the art that various modifications and improvements can be made. It should not be construed that the present invention is limited to the descriptions and the drawings that constitute a part of the present disclosure. On the basis of the present disclosure, various alternative embodiments, practical examples, and operating techniques will be apparent to those skilled in the art.

It is needless to mention that the present invention also includes various embodiments that are not described herein. Therefore, the technical scope of the present invention is to be defined only by the invention specifying matters according to the scope of claims appropriately obtained from the above descriptions.

REFERENCE SIGNS LIST 1 information processing device
10 sensor group (sensor)
11 camera (imaging unit)
12 map information acquiring unit
20 controller
21 point cloud acquiring unit
22 coordinate transformation unit
23 image acquiring unit
24 attribute information setting unit
25 pixel value calculating unit
26 image generating unit
27 sensor controlling unit

The invention claimed is:

1. An information processing method for an information processing device including an imaging unit configured to capture an image of surroundings of a vehicle and to generate a captured image, a sensor configured to generate point cloud data related to ranging points included in an imaging area of the imaging unit, and a controller configured to process data acquired from the imaging unit and the sensor, the information processing method comprising:
by using the controller,
assigning attribute information indicating a type of object or sign appearing in the captured image, to each ranging point, based on the captured image or the point cloud data;
calculating a distance from the imaging unit to the ranging point and a direction of the ranging point as viewed from the imaging unit based on the point cloud data;
calculating a pixel value for each ranging point based on the distance and the attribute information; and
generating a two-dimensional image in which pixel corresponding to the direction has the pixel value.

2. The information processing method according to claim 1, further comprising:
by using the controller, setting a correspondence relationship between the distance and the pixel value, in which, a shorter the distance, a greater a change in the pixel value per unit change in the distance.

3. The information processing method according to claim 1, further comprising:
by using the controller, setting a correspondence relationship between the distance and the pixel value, in which a change in the pixel value per unit change in distance at distance greater than a predetermined distance is greater than a predetermined value, when a speed of the vehicle is greater than a predetermined speed.

4. The information processing method according to claim 1, further comprising:
by using the controller,
selecting a first attribute information from the attribute information based on a behavior of the vehicle; and
setting a correspondence relationship between the distance and the pixel value, in which a change in pixel value per unit change in distance to the ranging point to which the first attribute information is assigned is greater than a predetermined value.

5. The information processing method according to claim 1, further comprising:
by using the controller,
determining whether or not a second attribute information is included in the attribute information; and
controlling the sensor to increase a spatial density of ranging points at a position of the ranging point to which second attribute information is assigned, in a case of determining that the second attribute information is included.

6. The information processing method according to claim 1, further comprising:
by using the controller,
determining whether or not a specific object exists around the vehicle based on a map information; and
controlling the sensor to increase a spatial density of ranging points at a position of the specific object, in a case of determining that the specific object exists.

7. The information processing method according to claim 1, further comprising:
by using the controller,
calculating position information of the ranging point in reference to a position of the imaging unit at a timing of imaging by the imaging unit, based on a timing of imaging by the imaging unit, a timing of generating the point cloud data by the sensor, and a movement information of the vehicle; and
calculating the distance and the direction based on the position information.

8. An information processing device comprising:
an imaging unit configured to capture an image of surroundings of a vehicle and to generate a captured image;
a sensor configured to generate point cloud data related to ranging points included in an imaging area of the imaging unit; and
a controller configured to process data acquired from the imaging unit and the sensor, wherein the controller is configured to: the
   assign attribute information indicating a type of object or sign appearing in the captured image, to each ranging point, based on the captured image or the point cloud data;
   calculate a distance from the imaging unit to the ranging point and a direction of the ranging point as viewed from the imaging unit based on the point cloud data;
   calculate a pixel value for each ranging point based on the distance and the attribute information; and
   generate a two-dimensional image in which pixel corresponding to the direction has the pixel value.

* * * * *